United States Patent [19]
Cooper et al.

[11] 3,929,752
[45] Dec. 30, 1975

[54] PREPARATION OF SOL CHLOROPRENE POLYMERS

[75] Inventors: Terence Alfred Cooper; Ausat Ali Khan, both of Newark, Del.

[73] Assignee: E. I. Du Pont de Nemours & Company, Wilmington, Del.

[22] Filed: Apr. 5, 1974

[21] Appl. No.: 458,185

[52] U.S. Cl. ...... 260/92.3; 260/82.1; 260/85.5 AM; 260/86.1 R; 260/87.5 R
[51] Int. Cl.² ...................... C08F 2/22; C08F 36/18
[58] Field of Search ...................... 260/87.5 R, 92.3

[56] References Cited
UNITED STATES PATENTS

| | | |
|---|---|---|
| 2,494,087 | 1/1950 | Daniels ............................ 260/92.3 |
| 3,704,283 | 11/1972 | Mayer-Mader et al. ............ 260/92.3 |

*Primary Examiner*—Edward J. Smith

[57] ABSTRACT

Addition of a defined tertiary amine in which at least one substituent is a 2-hydroxyethyl- or 2-hydroxypropyl-terminated chain of up to about 50 oxyethylene or 2-oxypropylene units to an aqueous alkaline emulsion in which chloroprene or a mixture of chloroprene with another monomer is undergoing polymerization in the presence of an alkyl mercaptan makes it possible to carry out the polymerization to a high degree of conversion, while at the same time avoiding excessive gel formation. This invention makes possible a significant increase in polymer yield without sacrifice of polymer quality or performance.

6 Claims, No Drawings

PREPARATION OF SOL CHLOROPRENE POLYMERS

BACKGROUND OF THE INVENTION

This invention relates to an improvement in the process for the polymerization of chloroprene to mercaptanmodified polymers.

Polymerization of chloroprene in an alkaline aqueous emulsion in the presence of alkyl mercaptans as chain transfer agents is well known. It has been customary in prior practice to stop chloroprene polymerization at a point at which no significant amount of gel was formed because a significant amount of such gel in a chloroprene polymer adversely affects such processing characteristics as polymer smoothness, die definition, and surface appearance of extruded objects. Furthermore, in the preparation of solvent based adhesives, such as rubber cements, it is undesirable to have present an excessive amount of solvent-insoluble material.

The point at which gel formation becomes apparent in a chloroprene polymerization varies with the temperature of polymerization. For example, at 40°C. in a normal emulsion system, the maximum monomer conversion possible has been in the neighborhood of 65 to 70%. While gel formation can be delayed by lowering the temperature of polymerization, changes in the crystalline nature of the resulting polymer make the polymer less suitable for certain low temperature applications of the final vulcanizate. At 0° to 10°C., polymerization can be carried to a conversion as high as about 90%. These polymers crystallize rapidly and are, therefore, well suited for use in adhesives. Even in these high-conversion polymerizations, it is economically desirable to increase the monomer conversion without producing substantial amounts of polymer insoluble in usual solvents.

There is, therefore, a great need for an economically attractive process for polymerizing chloroprene monomer to a high degree of conversion without sacrificing the desirable properties of the resulting polymer.

SUMMARY OF THE INVENTION

The improvement of the present invention provides for polymerization of chloroprene in an alkaline aqueous emulsion in the presence of a $C_8$–$C_{20}$ alkyl mercaptan and of about 0.05–1 part by weight, per 100 parts of the starting monomer, of an amine represented by the following formula (1)

$$R^1-\underset{\underset{R^3}{|}}{N}-R^2 \qquad (1),$$

wherein $R^1$ is a $C_6$–$C_{20}$ alkyl, alkenyl, aryl, aralkyl, or alkaryl; $R^2$ is represented by Formula (2)

$$-(CH_2CHO)_nH \qquad (2)$$

wherein $n$ is a number having an average value of from 1 to about 50, and $R^4$ in each parenthetical unit can be independently of any other such unit either hydrogen or methyl; and $R^3$ is phenyl, benzyl, a $C_1$–$C_5$ alkyl or a radical of Formula (2), as defined above.

If $R^3$ is a radical of Formula (2), the values of the subscript $n$ in $R^2$ and $R^3$ may, but do not have to be the same. However, the sum of the average values of $n$ should not exceed about 50.

Definition: For the purpose of the present disclosure, the terms "polymerization of chloroprene" and "chloroprene polymer" include copolymerization of chloroprene with up to equal weight of a copolymerizable monomer and a copolymer of chloroprene with a copolymerizable monomer, respectively. The term "monomer" means chloroprene or a mixture of chloroprene with a copolymerizable monomer.

DETAILED DESCRIPTION OF THE INVENTION

The presence of an amine having Formula (1), above, is critical to the success of the invention. In its presence, the polymerization can be allowed to proceed to a high monomer conversion and still produce a polychloroprene product substantially free of gel polymer.

An essential feature of the amines of Formula (1) is that they contain at least one radical represented by Formula (2), above, terminated by a 2-hydroxyethyl or 2-hydroxypropyl group. These amines are conveniently prepared by reaction of ethylene oxide and/or propylene oxide with a primary or secondary amine, $$R^1-NH_2 \text{ or } R^1-NH-R^3,$$
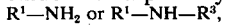

where $R^1$ and $R^3$ are as defined above. The preferred value of $n$ is within the range of 1 to 20. Starting with primary amines, at least two moles of the epoxy compound should be used, the resulting product having two radicals of Formula (2). No more than 50 moles of the epoxide should be allowed to react with the amine, whether primary or secondary, because more than this amount would change the hydrophilic nature of the compound.

Condensation of primary or secondary amines with ethylene oxide or propylene oxide is well known in the art. This reaction is usually carried out in the presence of water at a temperature of about 90°–120°C or higher. An alkaline catalyst, while normally not required is recommended, especially in the case of less basic starting aromatic amines. Suitable catalysts include, for example, sodium or potassium hydroxides. If the reaction is carried out in the absence of water, an alcoholic solution of potassium hydroxide is a practical catalyst. The amount of the catalyst is about 0.005–0.05 mole per mole of the starting amine. Certain polyalkoxylated amines within the definition of Formula (1) are commercially available.

In the preferred amines the radical $R^1$ is a $C_8$ to $C_{18}$ aliphatic hydrocarbon radical which can be linear or branched and may contain one double bond separated from the nitrogen atom by at least one saturated carbon atom. The most readily available starting amines are derived from animal or vegetable fats and oils, such as coconut oil and tallow. A frequently occurring radical is $C_{18}H_{35}$ or $C_3(CH_2)_7CH=CH(CH_2)_7-CH_2-$, derived from oleic acid. The aliphatic radical $R^1$ may also be obtained, for example, by the OXO process or from a low molecular weight polypropylene or polyisobutylene, the chain thus being branched.

Representative starting amines for reaction with ethylene oxide and/or propylene oxide include:

primary amines aniline
benzylamine
phenethylamine
toluidines xylidines
4-dodecylaniline
hexylamine
dodecylamine
octadecylamine
9-octadecen-1-ylamine
2-ethylhexylamine secondary amines N-dodecylaniline
N-octylbenzylamine
N-methylaniline
N-phenylbenzylamine
N-dodecylbenzylamine
N-amylhexylamine
N-butyldecylamine
N-methyleicosylamine The upper limit of the concentration range of the amine additive of Formula (1) in the polymerization medium is not critical, except that the desired effect is achieved at a concentration of up to about 1 part per 100 parts of monomer, and further increase of concentration is merely wasteful. However, below the lower limit of the concentration range, the effect of the amine may not be significant enough to be of practical interest.

Representative comonomers that can be copolymerized with chloroprene in the process of the present invention include vinyl aromatic compounds, such as styrene, the vinyl-toluenes, and vinylnaphthalenes; aliphatic conjugated dienes such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile.

The polymerization process is carried out in a manner well known in the art. The monomer is emulsified using a conventional carboxylated emulsifying agent. These emulsifying agents include water-soluble soaps of monocarboxylic acids containing 10 to 20 carbon atoms per molecule, which may be saturated or unsaturated fatty acids or rosin acids such as wood rosin or tall oil rosin or hydrogenated, dehydrogenated, or disproportionated rosin acids. The cations may be sodium, potassium, ammonium, or substituted ammonium; typical substituents being lower alkyl and hydroxyalkyl, especially methyl, ethyl, 2-hydroxyethyl, and 2-hydroxypropyl. The preferred emulsifying agents are the sodium, potassium, or ammonium salts of wood rosin or disproportionated rosin acids because of the desirable properties they impart to the resulting polymer, such as good tack and processability. About 1–4 parts by weight of emulsifying agent per 100 parts of monomer will normally be used, 3–4 parts being preferred.

An organic surfactant of the sulfate or sulfonate type may also be present in the polymerization system as additional emulsifying agent. Such surfactants are well known and include, among others, alkyl sulfonates, alkyl sulfates, sulfonated and sulfated ethers, sulfonated alkyl esters of long chain fatty acids, sulfonated glycol esters of long chain fatty acids, sulfonated N-alkylamides, alkylaryl sulfonates, and alkyl sulfosuccinates. A good discussion of sulfate and sulfonate surfactants suitable in the polymerization process according to the present invention can be found, for example, in U.S. Pat. No. 2,607,753, to James W. Adams, in column 4, lines 8–64. The preferred emulsifying agent of this type is the condensation product of formaldehyde and a naphthalene sulfonic acid in which the naphthalene nucleus can be substituted with one or more alkyl groups. The colloidal stability of the latex subsequent to the polymerization is increased in the presence of a sulfate or sulfonate type emulsifying agent. The same cations can be associated with sulfate and sulfonate type emulsifying agents as with carboxylic emulsifying agents. The concentration of any sulfate or sulfonate emulsifying agent, if present, is up to about one part by weight per 100 parts of monomer, 0.4–0.6 part being preferred.

The pH of the polymerizing emulsion is kept at about 10–13. The monomer concentration, while not critical, normally is about 40–60% of the total weight of the emulsion.

The alkyl mercaptans used as chain transfer agents can be branched or linear. Dodecyl mercaptan, which is frequently used, is a mixture of alkyl mercaptans derived from coconut oil and containing from ten to eighteen carbon atoms. Other useful mercaptans include octyl, tert-dodecyl, and tridecyl mercaptans. The proportion of the mercaptan will depend on the type of polymer desired. If a polymer of high Mooney viscosity (that is, relatively high molecular weight) is desired, only a small amount of chain-transfer agent is used. On the other hand, fluid polymers having Brookfield viscosities in the range of 1,000–1,000,000 centipoises at 25°C. can be prepared by using larger amounts of mercaptan. The useful range will be between 0.05 and 2 parts of mercaptan per 100 parts of monomer. While the viscosity of the polymer will largely depend on the amount of mercaptan present in the system, the viscosity of the polymer will vary somewhat from that obtained when amine of Formula (1) is absent. The mechanism of this effect is not clearly understood. The exact amount of each agent to be used can be readily determined by one skilled in the art.

Polymerization is initiated and maintained by the addition of a free-radical polymerization catalyst, such as alkali metal or ammonium persulfates or organic peroxy compounds. The temperature of polymerization can vary within the range from the freezing point of the emulsion (about 0°C.) to about 52°C., preferably from 10° to 48°C. When the desired degree of polymerization is reached, polymerization is stopped by adding a short-stopping agent such as, for example, phenothiazine and 4-tert-butylpyrocatechol. Unchanged monomer can be steam-stripped, for example, as shown in U.S. Pat. No. 2,467,769. The chloroprene polymer can be used as a latex or can be isolated from the latex, for example, by the freeze roll technique such as that disclosed in U.S. Pat. No. 2,187,146 or by any other conventional method.

Other conditions being the same, the presence of the amine of Formula (1) in the polymerization system makes it possible to obtain sol polymer substantially free of a gel component at a monomer conversion higher than was possible in prior art polymerization systems. In general, higher proportions of mercaptan and amine of Formula (1) are required at higher temperatures and for higher conversions. The required amounts of these ingredients can be readily determined by one skilled in the art. Monomer conversions of up to substantially 100% are obtainable in the instant process.

The invention now is illustrated by examples of certain representative embodiments thereof where all parts, proportions, and percentages are by weight, unless indicated otherwise.

EXAMPLE 1

An aqueous emulsion of chloroprene is prepared using the following recipe:

|  | Parts |
|---|---|
| Chloroprene | 100 |
| Disproportionated rosin | 3 |
| Dodecyl mercaptan (DDM) (a) | 0.28 |
| Amine of Formula (1) (b) | 0.2 |
| Water | 91.5 |
| Sodium hydroxide | 0.55 |
| Sodium salt of a condensate of formaldehyde and naphthalene-sulfonic acid (c) | 0.6 |
| Sodium sulfite | 0.3 |

(a) Technical dodecyl mercaptan, which is a mixture of mercaptans derived from coconut oil. A typical average composition by weight is: 3% 1-decanethiol; 61% 1-dodecanethiol; 23% tetradecanethiol; 11% 1-hexadecanethiol; and 2% octadecanethiol.

(b)
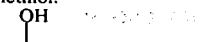

Alkyl—N(CH$_2$—CH(OH)—CH$_3$)$_2$ in which the alkyl radical is derived from coconut oil, predominantly dodecyl. The chain lengths of individual alkyl groups are similar to the chain lengths in dodecyl mercaptan.

(c) Commercially available as "Lomar" PW, Nopco Chemical Division, Diamond Shamrock Chemical Co.

Polymerization is carried out at 40°C. to a monomer conversion of 85%. The catalyst is an aqueous solution of potassium persulfate. Polymerization is stopped by adding an emulsion containing equal parts of phenothiazine and 4-tert-butylpyrocatechol (0.01 to 0.02 part per 100 parts of chloroprene). Unchanged monomer is removed by turbannular steam stripping, substantially as described in U.S. Pat. No. 2,467,769. The emulsion is acidified to a pH of about 5.6 with dilute acetic acid, and the polymer is isolated by freeze rolling as described in U.S. Pat. No. 2,187,146. A sample of the polymer is found to be completely soluble in benzene or toluene. (Solubility is determined by adding a 1–5 gram sample of polymer to 100 ml. of benzene or toluene in a bottle which is stoppered and shaken 4–8 hours at room temperature. The specimen is examined visually for an insoluble portion.) The Mooney viscosity of the isolated polymer is 44 (ML 1+2.5/100°C., ASTM D 1646–67). The processability (extrusion rate and appearance of a milled sample) and the physical properties, such as modulus, tensile strength, elongation and compression set, of vulcanizates are found to be substantially equivalent to those of a chloroprene polymer made by a similar recipe but in the absence of the amine additive in which the polymerization is stopped at a 65% conversion. If the polymerization is carried out to 85% without an amine of Formula (1), the resulting polymer contains a large amount of gel (crosslinked polymer which is insoluble), and the processing properties are adversely affected.

EXAMPLE 2

This experiment is carried out in the same way as Example 1 except that 0.1 part of dodecyl mercaptan and 0.2 part of the same amine additive are used. Polymerization is carried to 72 percent monomer conversion. The isolated polymer has a Mooney viscosity of 184 and is completely soluble in benzene or toluene. When the experiment is repeated omitting the amine and conversion is carried to 72 percent, the isolated polymer has a Mooney viscosity of 225 and contains 90 percent gel.

EXAMPLE 3

In this example, a fluid polymer is prepared. The recipe used is as follows:

|  | Parts |
|---|---|
| Chloroprene | 100 |
| Disproportioned rosin | 4 |
| Dodecyl mercaptan | 1.5 |
| Amine of Formula (1) in Example 1 | 0.5 |
| Water | 99.4 |
| NaOH | 0.24 |
| Sodium salt of condensate of formaldehyde and naphthalenesulfonic acid | 0.10 |
| Sodium sulfite | 0.15 |
| Ammonium hydroxide | 4 |

Polymerization is carried out at 40°C. using as catalyst an aqueous 0.15% solution of ammonium persulfate containing a trace of sodium 2-anthraquinonesulfonate.

Monomer conversion is about 89%. The unchanged monomer is removed by steam stripping and the resulting polymer is isolated by drum drying. The product is a fluid which is completely soluble in toluene. A 60% solution in toluene has a Brookfield viscosity of 5400 cps. at room temperature (using a No. 6 spindle).

The experiment is repeated using two parts of dodecyl mercaptan and no amine additive, and polymerization is carried to 87% monomer conversion. The product, although largely fluid, is not completely soluble in toluene.

EXAMPLE 4

A series of experiments is carried out as described in Example 1 using the following recipe:

|  | Parts |
|---|---|
| Chloroprene | 100 |
| Disproportioned rosin | 4 |
| Dodecyl mercaptan | (a) |
| Amine* | (b) |
| Water | 90.5 |
| Sodium hydroxide | 0.7 |
| Sodium salt of condensate of formaldehyde and a naphthalenesulfonic acid | (c) |
| Sodium sulfite | 0.3 |

(a) 0.28 part in 4A, and 4B; 0.26 part in the others
(b) 0.3 part in 4A, and 4B; 0.2 part in the others
(c) 0.4 part in 4A, and 4B; 0.7 part in the others
*See formula below.
*The amines have the following general formula (3):

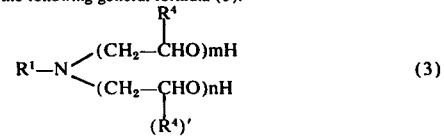

$$R^1—N\begin{matrix}(CH_2—CHO)mH \\ (CH_2—CHO)nH\end{matrix} \quad (3)$$

with $R^4$ and $(R^4)'$ substituents.

The meaning of $R^1$, $R^4$, and $(R^4)'$ is explained and the results are shown in the Table.

Table - Example 4

| | R¹ | R⁴ | (R⁴)' | m+n | Conversion % | Mooney Viscosity* |
|---|---|---|---|---|---|---|
| 4A | Stearyl (e) ($C_{18}H_{37}$) | H | H | 5 | 82 | (d) |
| 4B | $C_{12}$ to $C_{16}$-Alkyl (f) (from coconut oil) | H | H | 5 | 82 | (d) |
| 4C | Same as 4B | $CH_3$ | $CH_3$ | 4 | 83 | 34 |
| 4D | Same as 4B | $CH_3$ | $CH_3$ | 8 | 81 | 70 |
| 4E | Same as 4B | Mixed H and $CH_3$ | | 4 | 81 | 31 |
| 4F | $C_{16}$ to $C_{18}$ alkyl and alkenyl (from tallow) | $CH_3$ | $CH_3$ | 2 | 85 | 46 |
| 4G | Same as 4F | Mixed H and $CH_3$ | | 4 | 87 | 51 |

*ML 1 + 2.5 (100°C.)
(d) A solid; Mooney viscosity not measured
(e) "Ethomeen" 18/15, Armak Co.
(f) "Ethomeen" C/15, Armak Co.

In every case the isolated polymer is soluble in benzene or toluene.

EXAMPLE 5

This example is carried out using the same recipe as in Example 1 except that 0.16 part of dodecyl mercaptan and 96.5 parts of water are used. Polymerization is carried out at 10°C. using a redox catalyst system consisting of potassium persulfate, cumene hydroperoxide, and sodium hydrosulfite. Monomer conversion is 97.6%. The product is 86% soluble in benzene and is rendered completely soluble by shear mixing during preparation of a solvent cement.

For comparison a polymer is prepared in the absence of the amine. Polymerization is carried to 94.5% monomer conversion. This polymer is only 39% soluble and is completely unsuitable for the preparation of a solvent-type adhesive.

We claim:

1. In the process of polymerizing in the presence of a $C_8$–$C_{20}$ alkyl mercaptan and a carboxylated emulsifying agent in aqueous emulsion at a pH of about 10–13, chloroprene containing from 0 to about equal weight of a copolymerizable monomer at a temperature from the freezing point of the emulsion to about 52°C, the improvement of having present in the emulsion about 0.05–1 part by weight per 100 parts of the starting monomer, of an amine having the following formula (1)

$$R^1-\underset{\underset{R^3}{|}}{N}-R^2 \qquad (1),$$

wherein
   $R^1$ is $C_6$–$C_{20}$ alkyl, alkenyl, aryl, aralkyl, or alkaryl;
   $R^2$ is represented by the following formula (2)

$$-(CH_2\underset{\underset{R^4}{|}}{C}HO)_nH \qquad (2)$$

wherein $n$ is a number having an average value of 1 to about 50, and
   $R^4$ in each parenthetical unit is independently of any other such unit hydrogen or methyl; and
   $R^3$ is phenyl, benzyl, a $C_1$–$C_5$ alkyl or a radical having the above formula (2);
   with the proviso that when $R^3$ has the above formula (2), the sum of the average values of $n$ in $R^2$ and $R^3$ is at most about 50.

2. The improvement of claim 1, wherein the polymerization temperature is about 10°–48°C.

3. The improvement of claim 1 wherein $R^1$ in Formula (2) is an aliphatic hydrocarbon radical having 8–18 carbon atoms.

4. The improvement of claim 1 wherein the emulsifying agent is a sodium, potassium, or ammonium salt of wood rosin or of disproportionated rosin acid; the concentration of the emulsifying agent being about 1–4 parts per 100 parts be weight of monomer.

5. The improvement of claim 1 wherein there is also present in the emulsion up to one part by weight of a sulfate or sulfonate surfactant.

6. The improvement of claim 1 wherein the alkyl mercaptan is dodecyl mercaptan.

* * * * *